(12) United States Patent
Frank et al.

(10) Patent No.: US 11,489,786 B2
(45) Date of Patent: Nov. 1, 2022

(54) QUEUE MANAGEMENT SYSTEM, STARVATION AND LATENCY MANAGEMENT SYSTEM, AND METHODS OF USE (71) Applicant: ARTERIS, INC., Campbell, CA (US)

(72) Inventors: Michael Frank, Sunnyvale, CA (US); Mohammed Khaleeluddin, Santa Clara, CA (US)

(73) Assignee: ARTERIS, INC., Campbell, CA (US)

(*) Notice: Subject to any disclaimer, the term of this patent is extended or adjusted under 35 U.S.C. 154(b) by 0 days.

(21) Appl. No.: 17/134,546

(22) Filed: Dec. 28, 2020

(65) Prior Publication Data
US 2022/0210089 A1 Jun. 30, 2022

(51) Int. Cl.
H04L 47/62 (2022.01)
H04L 47/24 (2022.01)
H04L 47/2441 (2022.01)
H04L 47/56 (2022.01)
H04L 47/28 (2022.01)

(52) U.S. Cl.
CPC ...... H04L 47/6285 (2013.01); H04L 47/2441 (2013.01); H04L 47/2458 (2013.01); H04L 47/28 (2013.01); H04L 47/56 (2013.01)

(58) Field of Classification Search
CPC ............ H04L 47/6285; H04L 47/2441; H04L 47/2458; H04L 47/28; H04L 47/56
See application file for complete search history.

(56) References Cited

U.S. PATENT DOCUMENTS

| 2004/0210695 | A1 | 10/2004 | Weber et al. | |
| 2012/0159500 | A1* | 6/2012 | Cormode | G06F 11/3688 718/103 |
| 2015/0271255 | A1* | 9/2015 | Mackay | H04L 45/121 709/226 |
| 2021/0352020 | A1* | 11/2021 | Iwasawa | H04L 47/2458 |

FOREIGN PATENT DOCUMENTS

WO 2018170276 A3 2/2019

* cited by examiner

Primary Examiner — Jung H Park
(74) Attorney, Agent, or Firm — Jubin Dana; Dana Legal Services (57) ABSTRACT A quality of service (QoS) management system and guarantee is presented. The QoS management system can be used for end to end data. More specifically, and without limitation, the invention relates to the management of traffic and priorities in a queue and relates to grouping transactions in a queue providing solutions to queue starvation and transmission latency.

20 Claims, 5 Drawing Sheets

QUEUE MANAGEMENT SYSTEM, STARVATION AND LATENCY MANAGEMENT SYSTEM, AND METHODS OF USE

FIELD OF THE INVENTION

The invention relates generally to data management and, more specifically, to the management of traffic and priorities in a queue and grouping transactions in a queue providing solutions to queue starvation and transmission latency.

BACKGROUND

Quality of service (QoS) refers to any technology that manages data traffic. QoS is important for managing and controlling network resources. Network resources, and particularly the management of data traffic is important. Proper management of data traffic reduces latency (a type of time delay in delivery due to long queues), and jitter (a type of deviation or displacement) on a network. Furthermore, proper management of a network can improve communications through the maximization and efficiency of bandwidth. Bandwidth is the ability of a network to transmit data from one point to another over a given amount of time. The maximization and efficiency of bandwidth is more important than ever in a world driven by data and data transfer in important services, including but not limited to, telephony, computer networks, cloud computing services and the like.

To improve the quality of service provided, and to maximize bandwidth efficiency, traffic prioritization has become an important mechanism for achieving a high QoS. In many cases, in which bandwidth may be maximized, certain systems may not be able to function near as well, or even function properly without traffic prioritization. For these reasons, and others, traffic prioritization is especially important in computer networking and other packet-switched applications, such as interconnects or networks on a chip or telecommunication applications. In this way, the applications of traffic prioritization control are optimized for applications, users, and/or data flows.

Traffic prioritization as a method of delivery of data from end to end is not without its flaws. Within traffic prioritization as a quality of service mechanism, congestion can occur. In sending traffic with different priorities through a set of priority queues, a bandwidth or priority queue can continually displace lower priority traffic from the front of the queue. In this way, congestion can occur while starvation of the system also occurs. In other words, while end to end data gets prioritized in a high priority category, the low priority flow could be limited in transactions while the high priority requests turnover on a constant and/or consistent displacement of lower priority traffic. This prevents lower priority traffic from ever reaching the front of the priority queue. Said another way, prioritization can lead to a blocking effect that results in additional latency or a complete failure of delivery altogether.

As a result of prioritization systems failing to provide guarantees of delivery and struggling with consistent latency, there is a need for a system and method of use that provides for end to end data transmission without packet loss, latency, and/or jitter. Thus, there is a need for a system and method that guarantees delivery while still providing prioritization for efficiency.

SUMMARY OF THE INVENTION

The invention relates generally to quality of service (QoS) for end to end data. More specifically, and without limitation, the invention relates to the management of traffic and priorities in a queue and to grouping transactions in a queue providing solutions to queue starvation and transmission latency.

The invention provides end-to-end data and quality of service (QoS) management. More specifically, and without limitation, the invention provides a mechanism that groups arriving data transmissions into time windows (epochs, which can also be based on number of commands). In this way, the invention provides a solution to starvation of low priority data flows through a set of priority queues. This starvation occurs in data transmission when a constant stream of high priority requests continually displace lower priority traffic from the front of the queue. In accordance with various aspects and embodiments of the invention, and without limitation, the invention provides service guarantees, including meeting demands for bandwidth and/or latency requirements.

Additionally, and in accordance with various aspects and embodiments of the invention, a system of epochs, or time windows, are configured to provide a maximum duration of an epoch, which can be measured by time and/or by counting clock cycles and/or the number of transactions received. In accordance with various aspects and embodiments of the invention, a system defined by clock cycles, as defined furthermore herein, guarantees a maximum latency between the arrival of the first transaction in an epoch and the last transaction in an epoch.

In the arrangement shown, as one example, the processing of transactions within an epoch occurs in a defined priority order. Arriving transactions are assigned to an epoch. Various sorting methods and definitions are included herein, to guarantee complete processing of all arrivals. The processing of data in a first epoch will be completed before the processing of data in a second epoch. In this way, latency can be prevented, along with starvation. This system can guarantee strict ordering between transactions when required to maintain memory consistency.

In accordance with various aspects and embodiments of the invention, the system provides high priority real-time traffic with guaranteed service. In accordance with various aspects and embodiments of the invention, the system provides upgrading older, real-time traffic to the highest priority level upon arriving, when highest priority level is required. In accordance with various aspects and embodiments of the invention, the invention also includes providing the maintenance of strict ordering between transactions with ordering requirements, and in accordance with memory and transaction rules.

Systems that embody the invention, in accordance with the aspects thereof, are typically designed by describing their functions in hardware description languages. Therefore, the invention is also embodied in such hardware descriptions, and methods of describing systems as such hardware descriptions, but the scope of the invention is not limited thereby.

BRIEF DESCRIPTION OF THE DRAWINGS

In order to understand the invention more fully, reference is made to the accompanying drawings or figures. The invention is described in accordance with the aspects and embodiments in the following description with reference to the drawings or figures (FIG.), in which like numbers represent the same or similar elements. Understanding that these drawings are not to be considered limitations in the scope of the invention, the presently described aspects and embodiments and the presently understood best mode of the invention are described with additional detail through use of the accompanying drawings or figures.

DETAILED DESCRIPTION OF THE DISCLOSURE

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that mechanical, procedural, and other changes may be made without departing from the spirit and scope of the invention(s). The following detailed description is, therefore, not to be taken in a limiting sense, and the scope of the invention(s) is defined only by the appended claims, along with the full scope of equivalents to which such claims are entitled.

As used herein, the terminology such as vertical, horizontal, top, bottom, front, back, end, sides and the like are referenced according to the views, pieces and figures presented. It should be understood, however, that the terms are used only for purposes of description, and are not intended to be used as limitations. Accordingly, orientation of an object or a combination of objects may change without departing from the scope of the invention.

Reference throughout this specification to "one embodiment," "an embodiment," "one example," or "an example" means that a particular feature, structure, or characteristic described in connection with the embodiment or example is included in at least one embodiment of the invention. Thus, the appearance of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the invention may be embodied as an apparatus, method, or computer program product. Accordingly, the invention may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the invention may take the form of a computer program product embodied in any tangible medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the invention may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("Saas"), Platform as a Service ("PaaS"), and Infrastructure as a Service ("IaaS")), and deployment models (e.g., private cloud, community cloud, public cloud, and hybrid cloud).

The flowchart and block diagrams in the attached figures illustrate the architecture, functionality, and operation of possible implementations of systems, methods, and computer program products according to various embodiments of the invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

All illustrations of the drawings are for the purpose of describing selected versions of the invention and are not intended to limit the scope of the invention.

The following descriptions are in reference to FIG. 1 through FIG. 5. The invention relates to the management of the transmission of data. Furthermore, the invention guarantees quality of service for end to end data transmission. More specifically, and without limitation, the invention relates to the management of traffic and priorities in a queue. More specifically, and without limitation, the invention relates to grouping transactions in a queue providing solutions to queue starvation and transmission latency.

Although the invention may be explained in relation to examples of embodiments, it is to be understood that many other possible modifications and variations can be made without departing from the spirit and scope of the invention.

Figure 1:
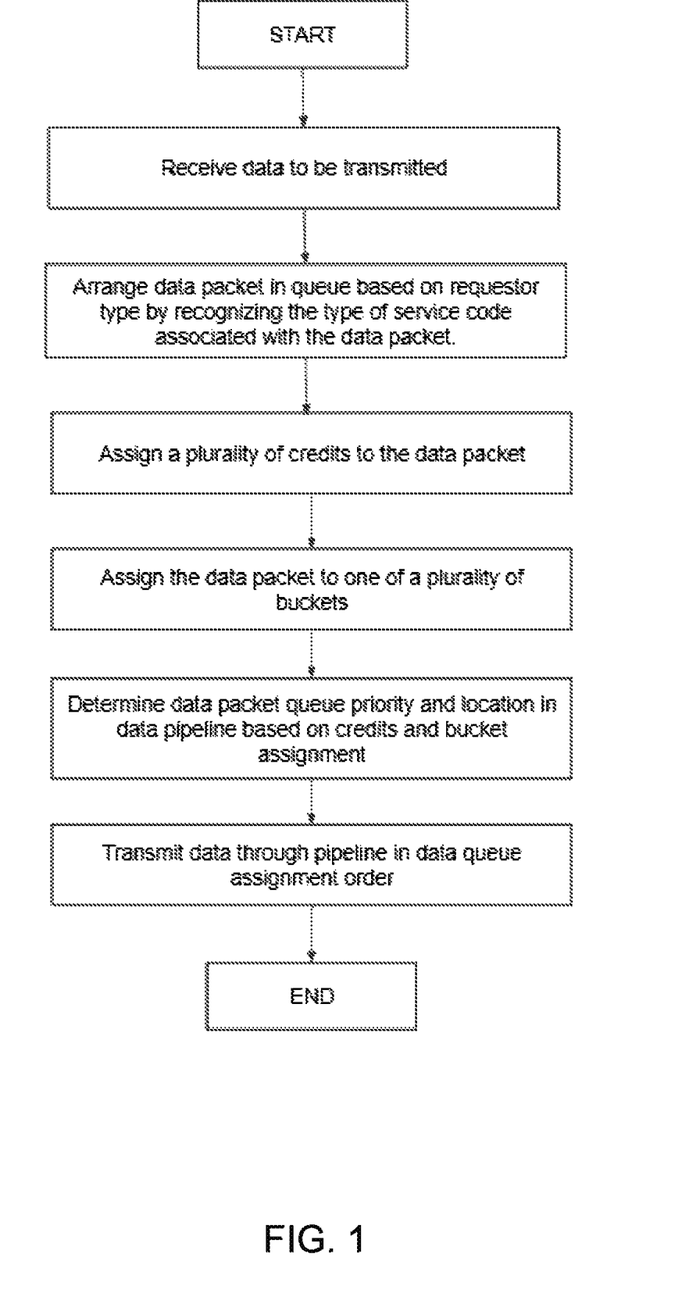
FIG. 1 illustrates an embodiment of a system in accordance with the various aspects and embodiments of the present invention.
Figure 2:
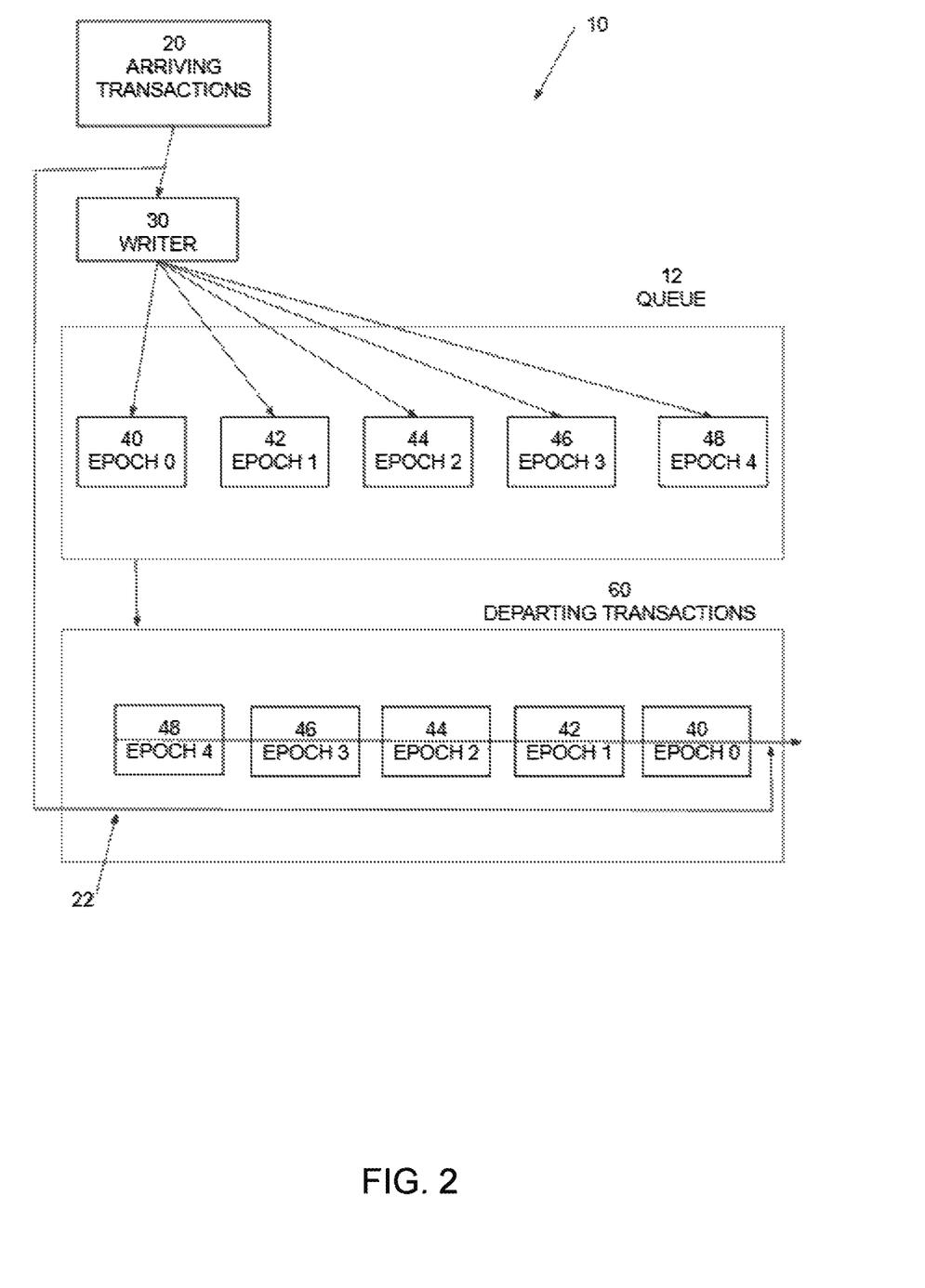
FIG. 2 illustrates an embodiment of a system in accordance with the various aspects and embodiments of the present invention.

With reference to the figures, a queue management system, starvation and latency management system, and methods of use are presented (hereafter known as "queue management system", "starvation and latency management system", "starvation prevention system", or "data transmission system" or simply "system"). Referring to FIG. 2, a queue management system 10 is formed of any suitable size, shape, and design. In accordance with various aspects and embodiments of the invention, the system 10 includes remote servers, databases, application servers, application databases, application programming interfaces, user databases, event databases, transmission rule databases, rules databases, data transmission components and/or features, mobile applications, and/or computers, and the like, that fulfill the functions disclosed herein.

In the arrangement shown, as one example, the invention provides these functionalities, systems, and solutions in the following general manner. First, arriving transactions are sorted into the queue, into epochs. An epoch may also be known as a time window. In this way, the maximum duration of an epoch can be measured, either by counting clock cycles, or by a transaction counter, or in another manner of measuring. In the example of counting clock cycles, the clock cycle will guarantee a maximum latency between the arrival of a first transaction and a last transaction within an epoch.

In the arrangement shown, as one example, transactions can also be sorted within an epoch. In this way, and in the arrangement shown, within an epoch, transactions occur in a priority order. Comparatively, transactions in different epochs will always be handled in sequential order. In accordance with various aspects and embodiments of the invention, transactions are handled according to an epoch+n order.

In addition to the non-blocking property discussed, and in the arrangement shown, as one example, the invention herein also presents various measures (further described herein) which include, but are not limited to: providing high priority, real-time traffic management with guaranteed service; upgrade older, real-time traffic to the highest priority at the instant any arriving transaction requires highest priority level handling (in real-time); maintaining strict ordering between transactions with ordering requirements (in accordance with various data transmission rules).

In this way, the invention provides a mechanism for distinguishing between transactions of different types. Additionally, in this way, the invention provides a mechanism for distinguishing between transactions of different priorities. Furthermore, in the arrangement shown, a mechanism is provided which separates a shared queue such that the shared queue provides a configurable number of available entries to be shared amongst said transactions. Furthermore, in accordance with various aspects and embodiments of the invention, the invention provides a mechanism that groups transactions into time slots (or epochs as further described herein) upon arrival to the queue.

In accordance with various aspects and embodiments of the invention, and in the arrangement shown, the invention provides a mechanism for arbitrating and processing of transactions within the same epoch. Subsequently, the mechanism moves onto the next epoch and/or the subsequent epoch for likewise arbitration and processing. Arbitration, in this example, may be based on various criteria such as arrival order, priority, arrival time (reading of clock) as well as any other means and/or criteria to distinguish between requests including, but not limited to, source, transaction type, destination, a combination thereof, and the like.

In accordance with various aspects and embodiments of the invention, a mechanism is provided to record and manage all active transactions. In accordance with various aspects and embodiments of the invention, a mechanism is provided to manage an allocation scheme. In the arrangement shown, as one example, an allocation scheme may partition the transactions based on various programmable quota values, for each group of transactions with the same priority level and/or quality of service goals. Additionally, and in the arrangement shown, the invention provides a mechanism to process and forward transactions, which meet certain criteria and/or for which a credit or level of credits has been received at the receiver, for the subsequent processing of said transaction.

Additionally, while the arrangement shown contemplates a singular shared queue for ease of example and explanation, multiple sub-queues are hereby contemplated for use. For example, the shared queue may be divided into two sub-queues, three sub-queues, four sub-queues, or more, and the like. In this way, different traffic types and/or different performance goals 78, and the like can be accomplished.

Referring now to FIG. 2, in the arrangement shown, as one example, system 10 includes a queue 12. Queue 12 is formed of any suitable size, shape, and design, and is configured to a dynamically situated pipeline for the purpose of providing guarantees of quality of service, in association with bandwidth and latency requirements. Queue 12 may also simply be known as a pipeline through which the data 18, in the arrangement, travels and interacts with the system 10 herein. More specifically, and without limitation, queue 12 is the waiting location for arriving transactions being organized and readied for departure.

In the arrangement shown, as one example, system 10 includes a plurality of arriving transactions 20 (hereafter known as "arriving transactions", "data", "data packets" or simply "transactions"). Arriving transactions 20 is formed of any suitable size, shape, and design, and is a term used to describe incoming traffic. In accordance with various aspects and embodiments of the invention, arriving traffic may come from various addresses, sources, with varying priorities 76. Additionally, and in the arrangement shown, arriving transactions may come from AXI, ACE lite, CHI, and may carry a QoS field and various other identifiers which can be used to determine the requirements and/or QoS goals 78.

In the arrangement shown, as one example, system 10 includes a writer 30. Writer 30 is formed of any suitable size, shape, and design, and is configured to assign arriving transactions 20 into the epochs 40/42/44/46/48 (to be further discussed herein) of the queue 12. In the arrangement shown, as one example, the writer 30 assigns each arriving transaction 20 to an epoch by labeling each arriving transaction with an epoch number or an epoch identifier, such as epoch 0, epoch 1 . . . epoch 4. In this way, the arriving transactions are each assigned to or associated with an epoch.

In accordance with various aspects and embodiments of the invention, epoch counting begins at zero. Each counter will increment at the designated increment level. In one example, the increment level is an age limit and/or time limit. In this way, the epoch timer increments at each time cycle. In this way, and in the example, an ordering dependency between transactions is created. Additionally, and in this example, the reader uses a private epoch counter. The epoch counter, like the writer 30, begins at zero and counts up incrementally. In this arrangement, the reader extracts entries from the queue 12 until all transactions of the current reader, of the epoch, have been handled. The epoch counter, increments, in this example, when no more transactions (of the current epoch) are available and when the writer 30 is not equal to the reader.

Said another way, in the arrangement shown as one example, initially, with an empty queue 12, operation starts in the writer 30 process with the arrival epoch and in the reader (to be further discussed herein). When arriving transactions enter system 10, the arriving transactions will be tagged as belonging to the arrival. The first transaction 16 enters the queue 12 and the writer process begins. The writer 30 will assign the arriving transactions to an epoch, which will determine departure of that transaction (the writer process to be further discussed herein).

In accordance with various aspects and embodiments of the invention, system 10 includes a reader. Reader is formed of any suitable size, shape, and design, and is configured to handle departing transactions and/or departing epochs. In this way, the reader and/or reader process starts with the departure of an epoch. While the reader is processing the epochs in the queue 12, the reader may harvest transactions that are old and/or have high priority. In this way, a reader will enable determinations in the departing transactions (the reader process to be further discussed herein).

In accordance with various aspects and embodiments of the invention, as one example, system 10 includes a plurality of epochs 40/42/44/46/48 (hereafter known as "data buckets", "buckets", or simply "epochs"). Epochs 40/42/44/46/48 are formed of any suitable size, shape, and design, and are configured as the main mechanism for starvation prevention by creating a manageable queue 12 set.

In the arrangement shown, as one example, epochs are time windows. In this way, an epoch creates a maximum duration, for which data 18 can sit in the queue 12. An epoch can be measured in time by either counting clock cycles or the number of transactions received. Counting clock cycles defines a guaranteed maximum latency between the arrival of a first transaction and the last transaction within an epoch.

In this way, an epoch creates a maximum latency for which a data packet 18 will sit within a queue 12. Said another way, transactions arriving in, and written to, different epochs, will process in a sequential order. This arbitration mechanism guarantees complete processing of all arrivals of epochs to have been processed before starting processing of arrivals from a subsequent epoch. This property is used to maintain strict ordering between transactions when required to maintain memory consistency.

Referring again to FIG. 2, in accordance with various aspects and embodiments of the invention, as one example, system 10 includes a plurality of departing transactions 60 (hereafter known as "departing transactions", "data", "data packets" or simply "transactions"). Departing transactions 60 is formed of any suitable size, shape, and design, and as data packets within epochs departing through the pipeline.

Additionally, departing transactions 60 may include high priority transactions that are placed ahead of an epoch or within a priority epoch for processing and immediate handling.

As one example, a system and method are presented in this invention for the purpose of providing guarantees in quality of service in association with bandwidth, latency, and other requirements. In the arrangement shown, as one example, the invention provides a method of use for end to end quality of service management.

As one example, shown in FIG. 1 through FIG. 5, each agent along the system manages queue 12 space using credits 14. Transactions 16, which originate in attached ACE/CHI/AXI requestors 90, enter at the top of the pipeline. Some of these transactions may already carry various QoS information. This information is in the form of a QoS identification. In accordance with various aspects and embodiments of the invention, this information will be read and/or determined by the system. In accordance with various aspects and embodiments of the invention, this information may be used to determine traffic type and priority level (for the management of quality of service).

In accordance with some aspects and embodiments of the invention, two main types of traffic occur. There are examples with more than two type of traffic and the scope of the invention is not limited thereby. These two common types of traffic are hard real time (HRT) traffic—a high priority traffic—and every other type of traffic. The system herein includes independent buffer management methods for allocations along the pipeline to avoid head of line blocking, which may occur from high priority traffic.

In handling traffic type and determining traffic type for data 18 handling, traffic type determination may be an important feature of the method herein because traffic type can affect the performance goals or QoS goals 78. For these reasons, traffic type may be configured on a per quality of service granularity. Additionally, traffic type may be configured on a performance goal QoS granularity. In this way, the granularity of the QoS handling can be on an individual agent basis.

In accordance with various aspects and embodiments of the invention, handling of data 18 will not be limited by or dependent on coherency. The methods presented in this invention can handle any traffic type—coherent or non-coherent—and the various traffic types may be assigned to any one of 16 different QoS buckets (or epochs). In accordance with some aspects and embodiments of the invention, QoS buckets are part of a certain traffic class, usually in a way where either QoS=<class, priority> or QoS is a more complex property, based on "performance goals" that are predicated on traffic type, for example latency-sensitive, bandwidth-sensitive or not-sensitive-to-either.

Furthermore, coherency traffic may be subject to QoS sorting based on the traffic class 74 of the original transaction. While 16 buckets are contemplated herein, any other number of QoS buckets, and types of QoS buckets are hereby contemplated for use. For example, it may be beneficial to have some QoS buckets reserved for specific types of traffic and/or specific types of senders and/or receivers. For example, some QoS buckets may be reserved for specific users and/or clients. Note, independent of service guarantees, memory consistency shall be maintained. In this way, ordering between transactions from the same sender to the same address, is maintained.

In the example discussed above, transactions at each target are inserted into the queue 12 (or a shared queue) based on the availability of credits 14, and the assignment of these credits 14. In accordance with various aspects and embodiments of the invention, special credits 80/82 budget is also hereby contemplated for use. An example, as used herein, is a special credit 80 budget which is allocated and/or reserved for HRT traffic with a priority level of 15. In the example discussed herein, priority level of 15 is the highest priority level. In this way, the traffic level would be considered a special class. In this way, the data 18 and/or data packet 18 would have been defined as a latency critical traffic. This traffic receives special consideration/processing while the rest of the queue 12 is shared by all other traffic—traffic not having HRT constraints. In other words, a special allocation for HRT in the buffer is contemplated for use for two main reasons: 1) The HRT traffic will always send through the queue 12 first—before any other transactions—therefore this traffic is guaranteed; and 2) HRT transactions will immediately depart in front of lower grade traffic and will push the notification of urgency to the next stage in the pipeline.

Said another way, this special allocation—jumping HRT having the highest priority level of 15 to the front of the queue 12—will create an open route for this transaction under most circumstances. This includes the transaction in the pipeline all the way down to the memory controller 88. In the memory controller 88, each of a plurality of buckets may use different arbitration 116 rules to guarantee QoS on the memory interface, with a bucket sacrificing efficiency for latency. For example, if 4 memory buckets—RT 156, HP 158, LP 160, BE 162—where RT is using rules that sacrifice efficiency for latency.

In this way, a traffic class 74 (having a priority level) will travel down the pipeline to the DMI, and based on the traffic class 74 and/or priority, the transaction 16 will be binned into one of the 4 buckets. In this example, the mapping is programmable. In accordance with various aspects and embodiments of the invention, it may use available credit information to upgrade specific traffic classes 74, if desired. Furthermore, the system may process more than one transaction 16 per clock cycle when the target bucket has availability and the memory controller has more than one AXI' port. This and other configurations are hereby contemplated for use.

Figure 3:
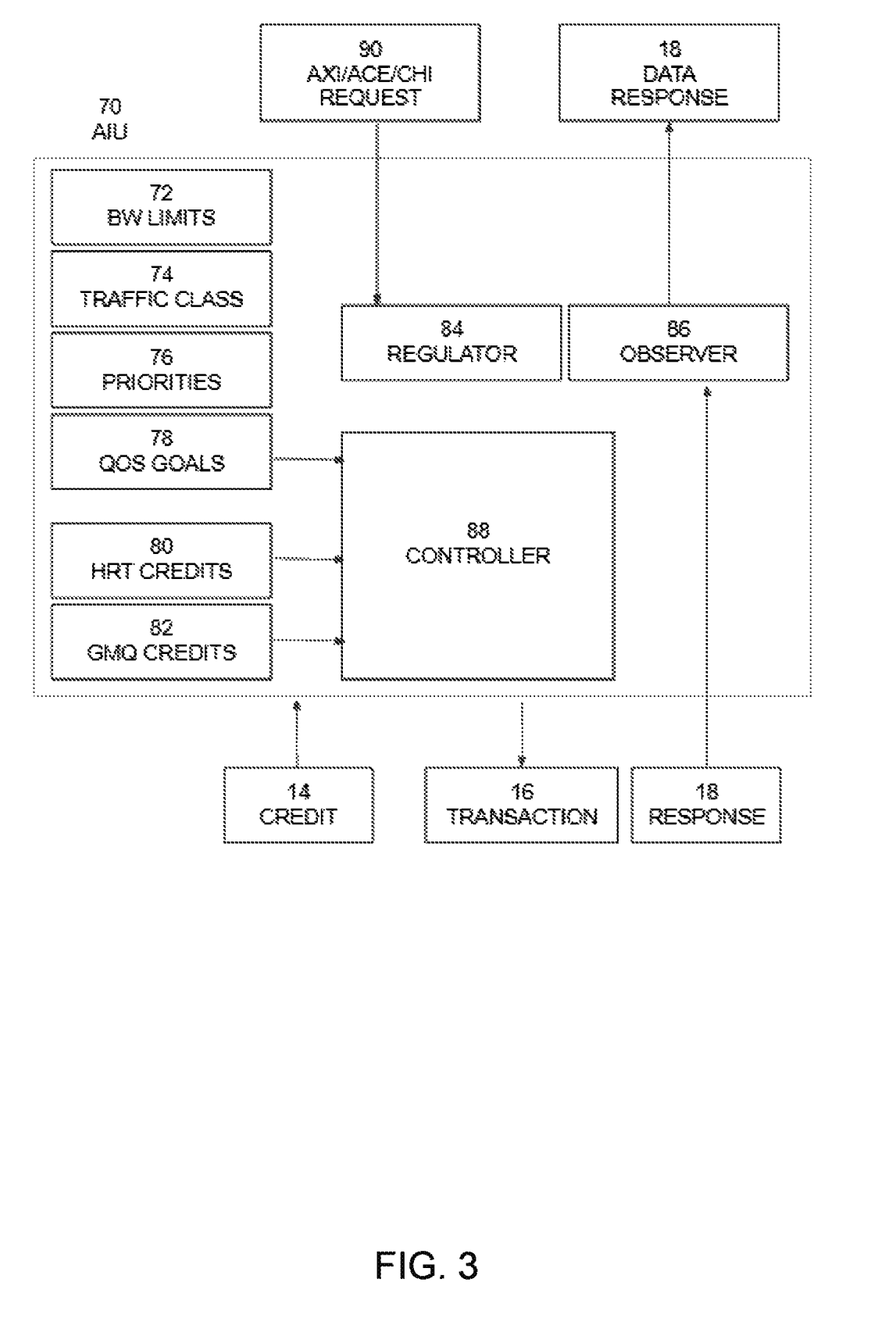
FIG. 3 illustrates an embodiment of a system in accordance with the various aspects and embodiments of the present invention.

In accordance with various aspects and embodiments of the invention, and as discussed herein and referenced in FIG. 2 and FIG. 3 and the other figures disclosed herein, a method of use and process are presented for managing and guaranteeing QoS in data transactions 16. In accordance with various aspects and embodiments of the invention, the method of use and process includes 1) receiving arriving transactions 20, 2) sorting arriving transactions 20 into epochs, 3) sending epochs through a data pipeline. This method of use and process guarantees that starvation will not occur and solves a long-standing latency issue, called head of line (HOL) blocking, found in the art.

As a first step in this example, arriving transactions 20 are sorted into buckets and/or epochs. In this way, information associated with the arriving transaction 20 will be read by the reader. The arriving transactions 20, particularly those in an agent interface unit (AIU) 70 coming from AXI, ACE Lite, CHI all carry a QoS field. This QoS field, or transactional identifications are used to determine any requirements and/or goals 78 for the arriving transactions 20, which is on an individual transaction basis. These requirements and/or pals for each transaction may determine what bucket the transaction is binned into.

In the arrangement shown, as one example, the various types of information associated with a given transaction—for sorting the transaction into a bin—may include, but are not limited to: address range, source of memory request, priority. An address range is a set of descriptors in the AIU 70. The source of memory request may change the handling of a transaction. For example, each requestor may provide additional control signals and/or identifications to determine the QoS value. Priority of sources is an assumption that a better QoS is determined by the ordered set of QoS with a lower value associated with a lower value. For example, a lower priority level may be 0, while the highest priority level may be 15.

In accordance with various aspects and embodiments of the invention, as one example, 16 QoS buckets are utilized. In accordance with various aspects and embodiments of the invention, any number of QoS buckets is hereby contemplated for use as may be needed. Each QoS bucket represents a flow and can be set with a set of characteristics and/or goals 78 and/or parameters. In accordance with various aspects and embodiments of the invention, each of these QoS buckets may contain traffic from 4 different classes (within a single bucket). In the example, herein, four traffic classes 74 are used. In accordance with various aspects and embodiments of the invention, any other number of traffic classes 74 is hereby contemplated for use. These four classes are: best effort (BE), bandwidth sensitive (BW), latency sensitive (LP), and hard real time (HRT). These are examples of data handling, and other methods and/or means are also hereby contemplated for use.

Best Effort (BE)

One of the classes included herein, but not limiting the invention is the BE. In the arrangement shown, as one example, this traffic type does not assume any specific performance goals and is serviced based upon available resources. For the BE class type, a BW or LP goal may be defined. In accordance with various aspects and embodiments of the invention, a dynamic priority management need not be done. In the arrangement shown, as one example, only traffic shaping and/or limiting the requested bandwidth used in a transaction will be implemented. In accordance with various aspects and embodiments of the invention, other shaping may also be contemplated and considered depending on the needs of a user.

Bandwidth Sensitive (BW)

One of the classes included herein, but not limiting the invention is BW traffic. In the arrangement shown, as one example, this traffic originates from a user who requires a certain memory bandwidth. This user may or may not be sensitive to latency for their desired data transmission and quality of service. An example of such a user and/or agent in this category might be a GPU. Additionally, and in the arrangement shown, as one example, traffic shaping will be implemented and the observed return bandwidth will be used to dynamically increase and/or decrease priority. In the arrangement shown, as one example, the initial priority of this type of request will be set by the initial priority field and the data transaction will be handled as such.

Latency Sensitive (LP)

Another class included herein, but not limiting the invention is LP traffic and processing. In accordance with various aspects and embodiments of the invention, as one example, this traffic handling is dedicated to traffic in which latency directly impacts the performance of the traffic and processing, but not functionality. An example of this type of traffic is CPU traffic. In this arrangement, observed latency will be used to dynamically increase or dynamically decrease priority. Additionally, the initial priority of this type of request will be set by the initial priority field and the data transaction will be handled as such.

Hard Real Time (HRT)

Another class included herein, but not limiting the invention is HRT traffic and processing. In the arrangement shown, as one example, this traffic may be traffic where violation of a maximum latency goal and/or minimum average bandwidth breaks functionality, for example displays, camera and/or audio subsystems. In this way, traffic shaping is maximized and bandwidth is maximized.

In accordance with various aspects and embodiments of the invention, each traffic type requires a different strategy to meet the goals 78 of the QoS associated with the traffic type. Therefore, the strategy determines how to prioritize competing transactions. In this example, at each traffic insertion point, such as AIU 70, a plurality of functions are implemented to achieve these goals 78, and more, including: a regulator 84—that controls the amount of traffic generated—and depending on the traffic type, the number of transactions will be limited to requesting a certain amount of bandwidth; an observer 86—that measures the returned bandwidth or latency for a specific bucket; a controller 88—that compares the traffic target against the achieved performance and, starting off the initial priority setting adjusting priority within a range from minimum priority to maximum priority; a bandwidth limit control 72; a latency target—where latency is measured using a moving window average with minimum latency being specified to reduce latency variation for dataflow through clients with limited size.

In accordance with various aspects and embodiments of the invention, the controller algorithm implements a proportional control for priority adjustment. Additionally, when configured for latency regulation, the QoS manager increases the priority whenever a returning transaction's latency is higher than the target, and decreases the priority when it is lower. For example, and in the arrangement shown, any time the configuration for a QoS bucket is updated, the priority register associated with that QoS bucket will be initialized to initial priority levels. Additionally, for every cycle that the latency of a transaction exceeds the maximum latency, the priority is increased by an amount; for every cycle that the latency of a transaction is less than the minimum latency, the priority is decreased by an amount.

In the arrangement shown, as one example, when configured for bandwidth regulation, the QoS manager increases the priority whenever the bandwidth estimate for the last transaction(s) is less than the target bandwidth. In this way, it will increase priority when the estimate is below the target. For example, in every completed transaction, the bandwidth contribution will be estimated, based on a programmable table, indexed by the transaction and the time that elapsed between successive transactions. This is one way of configuring the system.

In accordance with various aspects and embodiments of the invention, if the estimated effective bandwidth exceeds the target bandwidth, the priority for this QoS bucket will be proportionally decreased. Likewise, if the effective bandwidth does not meet the target bandwidth, the priority will be increased. In each of these modes, priority settings will be kept within a particular range, an applicable range.

Figure 4:
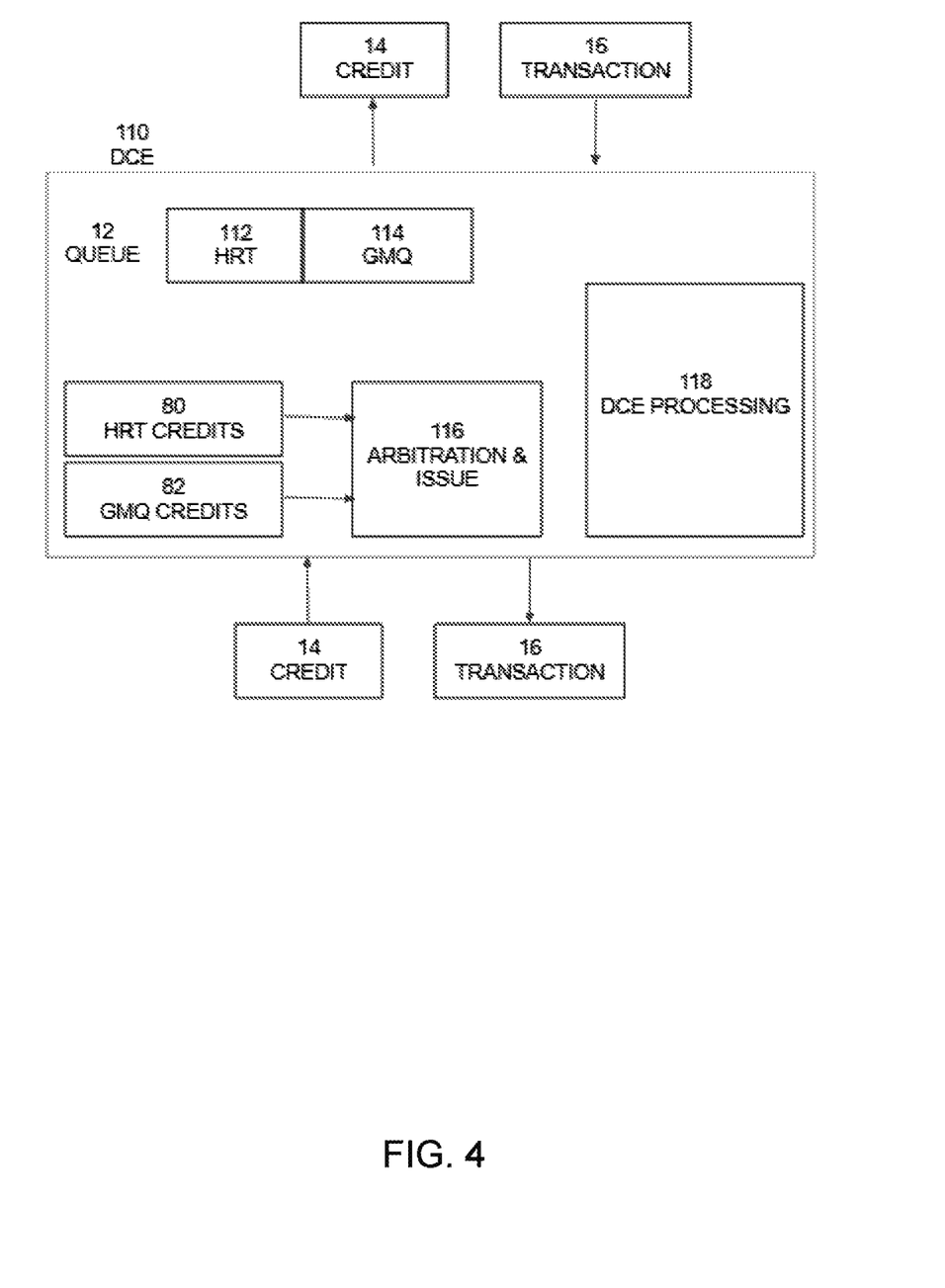
FIG. 4 illustrates an embodiment of a system in accordance with the various aspects and embodiments of the present invention.

In accordance with various aspects and embodiments of the invention, as one example and referenced in FIG. 2 and FIG. 4 and the other figures disclosed herein, a method of use and process is included that includes a DCE 110, or coherent cache directory, which filters and tracks copies of data, which must be kept coherent with one another. In this way, each DCE 110 is set up to observe and monitor one or more address ranges.

In the arrangement shown, as one example, arriving transactions 20 will be processed by at least one DCE 118. In this way, the input of the DCE 110, and arriving transactions 20 can be recorded in an entry. The entry and entry queue 12 will be shared between all traffic types, part of the entries being set aside for HRT 112 processing, while the rest of the entries processed as general traffic 114. In each entry which is removed, a credit is provided upstream.

Figure 5:
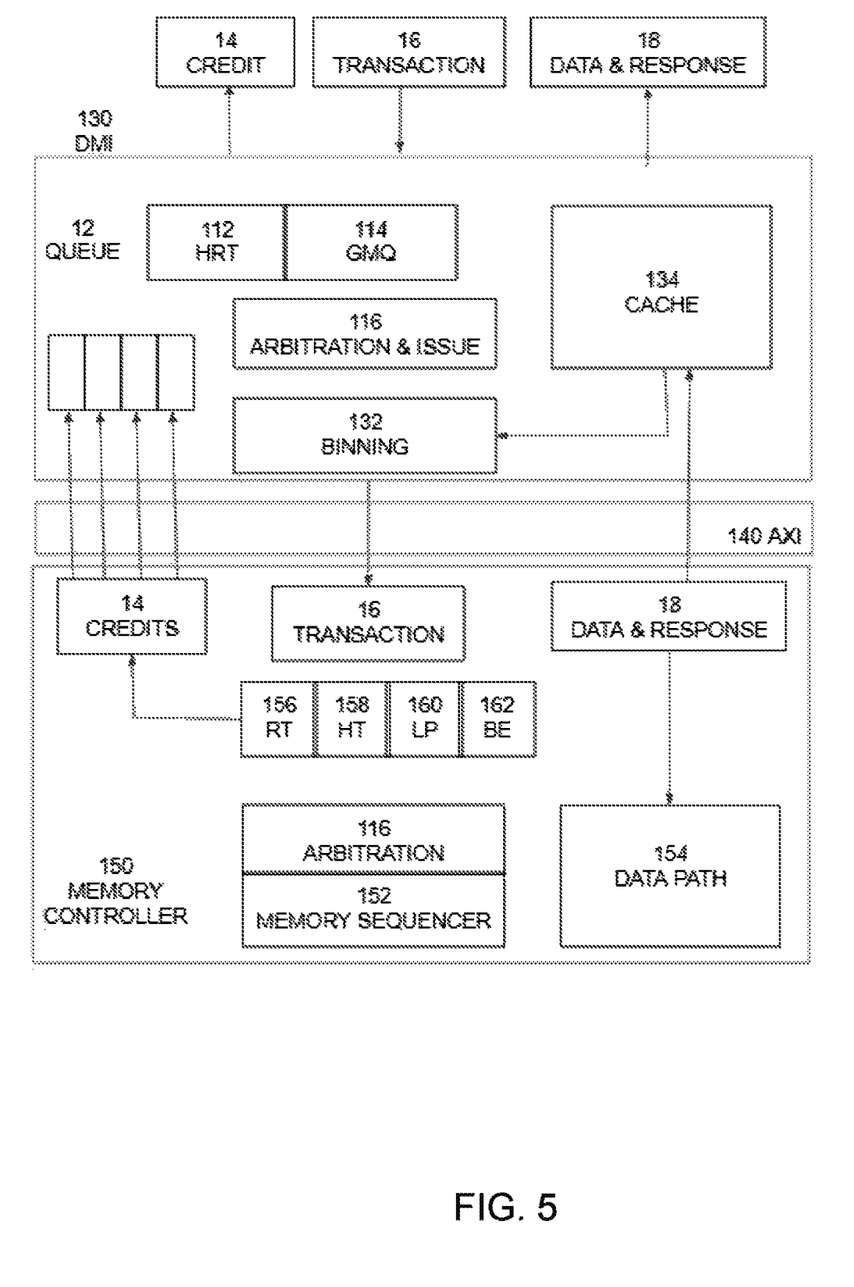
FIG. 5 illustrates an embodiment of a system in accordance with the various aspects and embodiments of the present invention.

In accordance with various aspects and embodiments of the invention, as may be implemented and referenced in FIG. 2 and FIG. 5 and the other figures disclosed herein, a method of use includes a DMI 130 and memory controller(s) 150. These may or may not be implemented along with a system memory cache. Furthermore, multiple DMI 130s may be used to provide more bandwidth and/or to support more DRAM interfaces.

Additionally, in the arrangement shown, as one example, the DMI 130 receives memory commands if the issuing agent owns credits. In this way, and in this example, there is a shared command queue 12, with two credit pools. The first credit pool is for HRT, highest priority level 76, while the second credit pool is for all other traffic.

In this method of use, the arbitration block extracts transactions from the queue 12 and checks if a copy of the transaction exists in the system memory cache 134. If no copy does exist or the address range accessed is non-cacheable, then the transaction will be forwarded to the binning block 132. The binning block 132 uses a map (a programmable map) to assign the request to one of the 4 buckets. If the DMI 130 has a credit available for the corresponding queue in the memory controller 150, then the transaction will be issued to the memory controller 150 via the AXI' interface 140.

In accordance with various aspects and embodiments of the invention, as one example and referenced in FIG. 2 and FIG. 5 and the other figures disclosed herein, each agent has been extended with provisions to assure: buffer for HRT transactions 112, forward propagation and/or memory sequencing 152 of priority upgrades for critical traffic, ordering the data path 154 between read and write transactions from the same initiator, and starvation avoidance.

In accordance with various aspects and embodiments of the invention, a writer process is included. As one example of the writer process, the writer process works as follows: when transactions arrive, the transactions are tagged as belonging to the arrival epoch and the arriving transactions 20 are entered into the queue 12 (whether entered into epoch 0, epoch 1, epoch 2, epoch 3, and so on); as the first transaction enters the queue 12, a timer will be started (in accordance with various aspects and embodiments of the invention, this timer will count clock cycles); the end of an epoch will be reached either when the timer reaches a (programmable) timeout value or when an arriving transaction 20 creates a hazard (WAW, WAR, RAW, same address, same source), and a new epoch will be started by incrementing the epoch number.

In accordance with various aspects and embodiments of the invention, a reader process is included. As one example of the reader process, the reader process works as follows: the reader process starts up with departure epoch 0; while the reader is processing an epoch N, it only sees non-HRT transactions or HRT transactions with a priority level less than 15 that have entered the queue 12 in arrival epoch N, and all transactions of type HRT at priority level 15 are visible, independent of their assigned epoch number; the reader harvests transactions, within each epoch, from the queue 12 starting with the oldest and highest priority level 76 entry, working through all entries until all visible transactions have been consumed; subsequently through every cycle the reader will select the oldest transaction with the highest priority, which ensures the forwarding of HRT at highest priority level 15 transactions; if the current arrival and current departure epoch have the same identifier, the arriving transactions 20 will become immediately visible and (if more than one transaction is available, will be forwarded in priority order; within the same priority, older transactions will be sent out first; and the reader process will finish the current departure epoch when no more visible non-HRT transactions remain. This guarantees, as soon as the epoch timer for the arrival epoch N expires, that no further transactions will be tagged as epoch N or will be entered in epoch N. This mechanism guarantees that no low priority transactions will be blocked by later arriving high priority transactions, therefore avoiding head of line blocking.

In accordance with various aspects and embodiments of the invention, the priority of departing transactions is set to their current value while HRT transactions will be changed to a priority value of high priority and/or priority level 15, if any other priority transaction level of 15 exists within the queue. Additionally, individual bandwidth goal transactions that are not initially high priority may also reach high priority level 15 and achieve a quasi HRT status, without the upgrade mechanism, mentioned previously herein. This would impact single flow, and some requestors would reach highest priority based simply on bandwidth goals. These and other methods of use and processes are hereby contemplated for use.

It will be appreciated by those skilled in the art that other various modifications could be made to the device without parting from the spirit and scope of this invention (especially various programmable features). All such modifications and changes fall within the scope of the claims and are intended to be covered thereby.

Certain methods according to the various aspects of the invention may be performed by instructions that are stored upon a non-transitory computer readable medium. The non-transitory computer readable medium stores code including instructions that, if executed by one or more processors, would cause a system or computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code having instructions according to various examples and aspects of the invention.

Certain examples have been described herein and it will be noted that different combinations of different components from different examples may be possible. Salient features are presented to better explain examples; however, it is clear that certain features may be added, modified, and/or omitted without modifying the functional aspects of these examples as described.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

To the extent that the terms "including", "includes", "having", "has", "with", or variants thereof are used in either the detailed description and the claims, such terms are intended to be inclusive in a similar manner to the term "comprising."

The scope of the invention, therefore, is not intended to be limited to the exemplary embodiments and aspects that are shown and described herein. Rather, the scope and spirit of the invention is embodied by the appended claims.

What is claimed is:

1. A system for managing quality of service (QoS) in data transmission, the system comprising:
a plurality of arriving transactions;
a writer;
a queue, wherein the queue includes a plurality of epochs, wherein the plurality of epochs have an epoch order and each epoch is a limited time interval defined by at least one a number clock cycles or number of arriving transactions; and
a data pipeline, wherein the data pipeline includes a plurality of departing transactions in accordance with the epoch order,
wherein the writer sorts and inserts each of the plurality of arriving transactions into one of the plurality of epochs of the queue based on a transactional differentiator,
wherein departing transactions from a selected epoch of the plurality of epochs are processed until all of the departing transactions of the selected epoch have been processed before processing departing transactions of a subsequent epoch.

2. The system of claim 1, wherein the transactional differentiator is a time stamp.

3. The system of claim 1, wherein the transactional differentiator is a priority consideration.

4. The system of claim 1, wherein the transactional differentiator includes both a time stamp and a priority consideration.

5. The system of claim 1, wherein the plurality of departing transactions must be in an epoch order and the epoch order ensures that the plurality of departing transactions are in the queue for a maximum duration of time.

6. The system of claim 1, wherein one of the plurality of arriving transactions is placed in a first epoch to depart due to a high priority classification.

7. The system of claim 1, wherein one of the plurality of arriving transactions is placed in a first epoch to depart, ahead of the plurality of other epochs, due to a high priority classification.

8. The system of claim 1, further comprising a plurality of epoch identifiers, wherein each of the plurality of arriving transactions are assigned an epoch identifier selected from the plurality of epoch identifiers and each of the plurality of arriving transactions are sorted according to the assigned epoch identifier.

9. The system of claim 1, wherein the epoch order is determined by epoch numbers and the lowest numbered epoch departs first.

10. The system of claim 1, wherein the epoch order is determined by a time stamp and a lone arriving transaction departs immediately in a first epoch, where there are no other arriving transactions.

11. A system for managing a quality of service (QoS) in data transmission, the system comprising:
- a plurality of arriving transactions;
- a writer;
- a plurality of credits; and
- a data pipeline, the data pipeline including a plurality of departing transactions,
- wherein the writer inserts the plurality of arriving transactions into a queue, the queue having a plurality of epochs, wherein each of the plurality of epochs have has a limited time interval defined by at least one a number clock cycles or number of arriving transactions,
- wherein the writer assigns a credit value to at least one arriving transaction selected from the plurality of arriving transactions and the arriving transaction is sorted into one of the plurality of epochs based on the credit value,
- wherein the plurality of arriving transactions are ensured a maximum latency when the writer assigns the plurality of arriving transactions to one of the plurality of epochs, and
- wherein departing transactions from a selected epoch are processed until all of the departing transaction of the selected epoch are processed before processing departing transactions from a subsequent epoch.

12. The system of claim 11, wherein the plurality of credits are assigned based on a time of arrival.

13. The system of claim 11, wherein the plurality of credits are assigned based on a priority consideration.

14. The system of claim 11, wherein the plurality of credits are assigned based on both a time of arrival and a priority consideration.

15. The system of claim 11, wherein the plurality of departing transactions are in an epoch order and the epoch order ensures that the plurality of departing transactions are in the queue for a maximum duration of time.

16. The system of claim 11, wherein each of the plurality of arriving transactions are sorted into the plurality of epochs in accordance with ordering requirements.

17. The system of claim 11, wherein one of the plurality of arriving transactions is placed in a first epoch to depart, ahead of other plurality of epochs, due to a high priority classification.

18. The system of claim 11 further comprising a priority classification identifier, wherein one of the plurality of arriving transactions is placed ahead of the plurality of other epochs due to a high priority classification.

19. A method for guaranteeing a quality of service (QoS), the method comprising the steps of:
- receiving a plurality of arriving transactions;
- writing a sorting assignment to each of the plurality of arriving transactions;
- sorting each of the plurality of transactions into one of a plurality of epochs, wherein each epoch is a limited time interval defined by at least one a number clock cycles or number of arriving transactions; and
- sending departing transactions from a selected epoch until all the departing transaction of the selected epoch are processed before processing departing transactions from a subsequent epoch in a queue of the plurality of epochs, wherein each of the plurality of epochs is assigned a designated epoch number.

20. The method of claim 19 further comprising the step of writing a sorting assignment to each of the plurality of arriving transactions, wherein the sorting assignment is determined based on a plurality of transactional differentiators.

* * * * *